United States Patent [19]
Leverett

[11] 3,929,721
[45] Dec. 30, 1975

[54] PROCESS FOR REDUCING FILLER LOSS IN TETRAFLUOROETHYLENE POLYMER PARTICLES

[75] Inventor: Glenn Frederick Leverett, Vienna, W. Va.

[73] Assignee: E. I. Du Pont de Nemours & Company, Wilmington, Del.

[22] Filed: Dec. 11, 1974

[21] Appl. No.: 531,482

Related U.S. Application Data

[63] Continuation-in-part of Ser. No. 473,159, May 26, 1974, abandoned.

[52] U.S. Cl...... 260/42.15; 260/29.6 F; 260/33.8 F; 260/34.2; 260/42.22; 260/42.26; 260/42.27; 260/827
[51] Int. Cl.².. C08K 3/08; C08K 9/06; C08L 83/04
[58] Field of Search........... 260/29.6 F, 34.2, 42.26, 260/42.27, 827, 33.8 F, 42.22, 42.15

[56] References Cited
UNITED STATES PATENTS

| | | | |
|---|---|---|---|
| 3,062,764 | 11/1962 | Osdal | 260/827 |
| 3,766,133 | 10/1973 | Roberts et al. | 260/92.1 |
| 3,787,281 | 1/1974 | Effenberger | 161/188 |
| 3,804,801 | 4/1974 | Day et al. | 260/827 |
| 3,838,082 | 9/1974 | Sauer | 260/29.6 F |

FOREIGN PATENTS OR APPLICATIONS

| | | |
|---|---|---|
| 7,116,894 | 6/1972 | Netherlands |
| 555,481 | 8/1943 | United Kingdom |
| 1,277,808 | 6/1972 | United Kingdom |
| 1,250,798 | 10/1971 | United Kingdom |

*Primary Examiner*—Melvin I. Marquis
*Assistant Examiner*—H. H. Fletcher

[57] ABSTRACT

The agglomeration of finely-divided granular tetrafluoroethylene polymer particles to produce agglomerated particles having improved flow properties is carried out by agitating the finely divided particles in an aqueous dispersion containing a substantially water-immersible organic liquid. The finely-divided particles can first be blended with particulate glass or bronze filler material and the blend agglomerated. The pressence of an amino-functional organosilane or a silicone resin while agitating the aqueous dispersion of the blend of the filler material and the finely-divided tetrafluoroethylene polymer effectively reduces loss of filler during the agglomeration procedure.

11 Claims, No Drawings

PROCESS FOR REDUCING FILLER LOSS IN TETRAFLUOROETHYLENE POLYMER PARTICLES

CROSS-REFERENCE TO RELATED APPLICATIONS

This application is a continuation-in-part of application Ser. No. 473,159, filed May 24, 1974, and now abandoned.

FIELD OF THE INVENTION

This invention relates to the agglomeration of blends of granular tetrafluoroethylene polymer particles and particulate glass or bronze fillers.

BACKGROUND OF THE INVENTION

The practice of agglomerating finely-divided granular tetrafluoroethylene polymer particles to increase their flowability while retaining their moldability properties is known. One method of agglomerating the finely-divided granular tetrafluoroethylene polymer particles is to agitate them in a two phase liquid medium of water containing an organic liquid that is capable of wetting the particles and which is soluble in water to at most only about 15% by weight at the operating temperature. The solubility requirement means that the organic liquid is substantially immiscible in water.

It is also known that blends of the finely-divided polymer particles and particulate filler materials can be agitated and agglomerated in the same manner. However, if the filler material is hydrophilic, filler is lost to the aqueous phase during the agglomeration process.

Such loss is undesirable for several reasons. For example, quality standards are difficult to maintain since the loss can vary from batch to batch. Moreover, it is costly to recover lost filler from the aqueous phase and costly to be forced to use more filler than necessary in the initial blend in order to get approximately the right amount in the agglomerated product. In addition, the loss is visibly noticeable in the final molded product because of loss of filler from the surface of each particle of agglomerated product.

Certain organo functional silane and silicone compounds are known to be useful in coupling resins with fillers to improve the strength of the molded resin. But with granular polytetrafluoroethylene resins the filler has heretofore been treated with the silane or silicone prior to mixing the filler with the resin, and this has not prevented filler loss.

SUMMARY OF THE INVENTION

The invention described herein is a process for preparing agglomerated granules of granular tetrafluoroethylene polymers containing a filler of particulate glass or bronze, which comprises agitating a mixture of finely-divided granular tetrafluoroethylene polymer particles, particulate glass or bronze filler particles, and either (1) an amino-functional organosilane, or (2) a silicone resin, in a two-phase liquid medium of water and a substantially waterimmiscible organic liquid; and separating the resulting agglomerated granules from the liquid medium.

The process reduces loss of filler during agglomeration.

DESCRIPTION OF THE INVENTION

In general, the agglomeration of granular tetrafluoroethylene polymers is well known. The tetrafluoroethylene polymers used are unsintered, are of the granular type made by suspension polymerization (as distinguished from the "fine powder" type made from aqueous dispersion polymerization), and are non-melt-fabricable.

By tetrafluoroethylene polymer is meant the homopolymer of tetrafluoroethylene (PTFE) and copolymers thereof wherein the amount of comonomer present in polymerized form is small enough to maintain the non-melt-fabricable nature of the copolymer. Generally, this small amount will be less than 2% by weight based on the weight of the copolymer. The comonomer can be an ethylenically unsaturated copolymerizable monomer, such as perfluoroalkene of 3–6 carbon atoms, e.g., hexafluoropropylene, or a perfluoro(alkyl vinyl ether) of 3–6 carbon atoms, e.g., perfluoro(propyl vinyl ether). These polymers are not melt-fabricable, i.e., they have an apparent melt viscosity of at least $1 \times 10^9$ poises at 380°C. The melt viscosity is measured according to American Society of Testing Materials test D-1238-52T, modified as described following: The cylinder, orifice and piston tip are made of a corrosion-resistant alloy, Haynes Stellite 19, made by Haynes Stellite Co. The sample is charged to the 9.53 mm. inside diameter cylinder, which is maintained at 372°C. ± 1°C. Five minutes after the sample is charged to the cylinder it is extruded through a 2.1 mm. diameter, 8 mm. long orifice under a load (piston plus weight) of 5000 grams. This corresponds to a shear stress of 0.457 kilograms per cm.$^2$. The melt viscosity in poises is calculated as 53150 divided by the observable extrusion rate in grams per minute.

Tetrafluoroethylene polymer granules, as obtained from suspension polymerization, have an average diameter of about 1000 microns. For use in the agglomeration procedure, these granules are ground into finely-divided particles of an average particle size based on the number of particles of below about 200 microns and usually to about an average size of less than about 100 microns, for the ability to obtain agglomerates having good molding properties depends on the small initial particle size of the polymer to be agglomerated. The average particle size will depend on the degree of grinding. Generally, the average size should be at least about 5 microns.

The substantially water-immiscible organic liquid used should have sufficient immiscibility with the water and sufficient wettability for the finely-divided tetrafluoroethylene polymer to cause formation of the agglomerates on agitation. Generally, the immiscible organic liquid can be soluble in water up to 15% by weight at the operating temperatures of the process. Preferably the solubility will be less than 1%. The organic liquid is present in the water in an amount sufficient to provide a non-aqueous phase. The wettability of the organic liquid can be expressed through its surface tension, which should be no greater than about 40 dynes/cm. at 25°C. Generally, the surface tension should be at least 10 dynes/cm. at 25°C. Examples or organic liquids useful herein include aliphatic hydrocarbons, such as pentane and dodecane; alicyclic hydrocarbons, such as cyclohexane or methyl cyclohexane; aromatic hydrocarbons such as benzene, toluene or xylene; and halogenated hydrocarbons, such as, tetrachloroethylene, trichloroethylene, chloroform or chlorobenzene; and the like. Generally, the hydrocarbons will contain no more than 12 carbon atoms. The organic liquid generally is present in an amount between 0.1 to 0.5 cc of the organic liquid per gram of tetrafluoroethylene/filler blend employed. The exact amount employed will influence the particle size of the agglomerated filled tetrafluoroethylene polymer.

The water can be demineralized water, if desired, but such is not necessary.

The particulate fillers used herein are glass fillers such as glass fibers or glass beads, or powdered bronze fillers. These are commercially available fillers for filling resins. The filler may be present in an amount of from 5% to 40% by volume based on the volume of the tetrafluoroethylene polymer and the filler. The filler, when in particle form, i.e., bead or powder, should preferably have an average size no greater than about the size of the resultant agglomerates and preferably smaller so that in the resultant free-flowing agglomerates, which are usually of 250 to 1000 micron average particle diameter, the filler particles are largely enveloped by the polymer. When in fiber or flake form, the length of the fiber or the largest length of the plate, as the case may be, should preferably be less than the size of the resulting agglomerate. However, protruding portions of the fiber, flake or particle are not substantially deleterious to powder flow.

The amino-functional organosilane has at least one water-hydrolyzable functional group attached directly to the Si atom of the silane and at least one amino-functional containing organic group connected directly to the silicon atom of the silane through a stable carbon-to-silicon bond. It is believed that the water-hydrolyzable functional group of the silane forms a bonding relationship with the filler and the amino-functional group forms a bonding relationship with the PTFE, thereby coupling the filler to the PTFE. These silanes can be described in greater detail as being represented by the formula $$A-\underset{\underset{D}{|}}{\overset{\overset{D}{|}}{Si}}-B$$

wherein A is the water-hydrolyzable functional group, B is the organic group containing the amino-functional group, and each D can be either A, B, or an alkyl group, preferably containing from 1 to 5 carbon atoms, or aryl, preferably containing from 6–10 carbon atoms, or alkaryl, preferably containing 7–10 carbon atoms, or aralkyl, preferably containing 7–10 carbon atoms. Examples of group A include hydroxyl, halogen such as Cl or F; or alkoxy, preferably containing from 1 to 5 carbon atoms. Examples of group B include aliphatic and aromatic hydrocarbyl groups of 1–14 carbon atoms containing amino-functionality in which the amino-function can be primary, secondary or tertiary. Thus, B includes

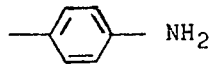

bonded directly to the Si atom or indirectly thereto, such as through an alkylene group of 1–4 carbon atoms; $-(CH_2)_xNH_2$ wherein $x$ is an integer of from 2 to 12, but preferably 3 to 9; $-(CH_2)_yNH(CH_2)_zNHR$ wherein $y$ is an integer of from 2 to 4, and $z$ is an integer of from 1 to 4, and R is H, methyl or ethyl; and $-(CH_2)_x-N(CH_3)_2$, wherein $x$ has the same meaning as before. Preferred silanes include the omega-aminoalkyltrialkoxy silanes, such as gamma-aminopropyltriethoxy silane, meta and para aminophenyltriethoxy silane, and N(n-propyl trimethoxysilyl) ethylene diamine. The amino-functional organosilane can be present in the mixture to be agitated in amounts of from 0.01 to 5 parts, preferably 0.1 to 1 part, per 1000 parts by weight of water present.

The silicone resin employed is a soluble resin having the recurring structure

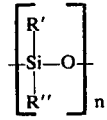

wherein R' and R'' are each independently a hydrocarbyl radical of 1 to 20 carbon atoms, e.g., alkyl, aryl, alkaryl and aralkyl and one of R' or R'' may be hydrogen, and $n$ is an integer of between about 100 and about 2000, and wherein the resin may be modified with up to 4% (0–4%) hydroxy function. The silicone resin is present in the mixture to be agitated in an amount of between about 0.5 to 30 parts per 1000 parts of filled tetrafluoroethylene polymer blend. By "soluble" is meant that the resin is not crosslinked, i.e., gelled, and therefore is soluble in the usual solvents therefor, e.g., tetrachloroethylene. Examples of silicone resins include phenyl methyl siloxane, dimethyl siloxane containing 0.5% hydroxy function, monophenyl siloxane containing 1.5% hydroxy function, monophenyl siloxane containing 4.0% hydroxy function, and propyl phenyl siloxane.

The order in which the ingredients of the mixture to be agglomerated are mixed together is not important. Usually, the water is heated to the desired temperature and the organic liquid is added. When a silicone resin is used, it has usually already been dissolved in the organic liquid; and when an amino-function silane is used, it is usually added to the water/liquid mixture just prior to adding the blend of polymer and filler.

The mixture will ordinarily contain from about 5 to about 30% by weight solids.

The mixture is slurried by agitation whereupon agglomeration of the initial blend occurs. The degree of agitation is not critical and can be varied to obtain particles of the size desired. The degree, temperature and time of agitation are interdependent, e.g., with more vigorous agitation, shorter times can be used. Generally, the mixture can be agitated for between about 5 and 120 minutes at a temperature of between about 0° and about 100°C. provided the temperature is not high enough to cause boiling at the pressure used. For convenience, the agitation may ordinarily be carried out at between 10°–90°C., and preferably between 25°–70°C. Pressure is not critical and the agitation is usually carried out at atmospheric pressure in an ordinary baffled treatment vessel. The agitation may be varied during the preparation, usually by reducing the agitation during the process, e.g., from agitation at a power of 7–16 kg.m./sec./l. to a power of 0.2–15 kg.m./sec./l., but such is not necessary.

Following agitation, the resulting agglomerated blend is separated from the liquid medium by filtration, which removes mainly the water phase, followed by drying, preferably in equipment which permits recovery of the organic liquid. Although drying can be carried out at temperatures up to just below the sinter temperature of the tetrafluoroethylene polymer, drying is usually carried out at between 125°C. and 200°C.

The resulting dried agglomerates are useful for ram extrusion and for molding, e.g., in automatic molding equipment to mold articles which can be sintered to high quality shaped articles.

The invention is more specifically illustrated in the following examples.

In the examples the "standard specific gravity" (SSG) of the polytetrafluoroethylene is determined by water displacement of a standard molded specimen based upon ASTM D-1457-69. The procedure employed comprises molding the test specimen by preforming a 12-gram sample of polytetrafluoroethylene powder at 8000 psi (352 kg/cm²) in a mold 1⅛ inch in diameter (2.86 cm). The preform is placed in an oven preheated to 300°C. The temperature of the oven is then raised to 380°C. at the rate of 2°C. per minute. The temperature of the oven is maintained at 380°C. for 30 minutes and the oven is then cooled to 295°C. at a rate of 1°C. per minute. The temperature is maintained at 295°C. for 25 minutes after which the test specimen is removed, allowed to cool to room temperature and the specimen tested for specific gravity (ASTM 792-66).

The term "apparent density" (AD), as used herein, is measured by pouring 50 g of sample into a 100 cc graduated cylinder and the volume measured without tapping.

"Tensile strength" (TS) and "elongation" are determined in accordance with ASTM D-1457-69, but using the modified thermal cycle as described above under standard specific gravity.

"Average particle size" is determined by a dry sieving procedure as follows: The sieve set (7.62 cm.) is assembled in order, with the largest opening on top. The openings are:

18 mesh (1000 micron)
25 mesh (707 micron)
35 mesh (500 micron)
45 mesh (350 micron)
60 mesh (250 micron)
80 mesh (177 micron)
120 mesh (125 micron)

10 grams of the powder to be tested, weighed to the nearest ± 0.01 gram, is charged to the top screen. The screen set is hand shaken for about 3 minutes.

After shaking, the weight of material retained on each sieve is determined to ± 0.01 gram. The cumulative percentage is calculated, as shown in the representative example following:

| Sieve No. | | Gross Wt. | Tare Wt. | Net Wt. | ×10 | Cumulative % |
|---|---|---|---|---|---|---|
| 18 | 1000 | 95.92 | 94.92 | 10 | | 10.0 |
| 25 | 707 | 95.57 | 93.27 | 23 | | 33.0 |
| 35 | 500 | 24.31 | 91.01 | 33 | | 66.0 |
| 45 | 350 | 91.58 | 89.22 | 23.6 | | 89.6 |
| 60 | 250 | 88.04 | 87.20 | 8.4 | | 98.0 |
| 80 | 177 | 90.69 | 90.59 | 1.0 | | 99.0 |
| 120 | 125 | 84.60 | 84.60 | 0 | | 99.0 |
| 170 | 88 | | | | | |
| 230 | 63 | | | | | |
| 325 | 44 | | | | | |
| Pan | | | | | | |

The average particle size and size distribution are determined by plotting the cumulative percentage vs. size on log-probability paper. The average particle size is read from the plot at the 50 percentage abscissa.

The percent mold shrinkage (MS) is determined by measuring the diameter of the molded chip used to determine SSG after sintering, using the equation:

$$MS = \frac{\text{mold diameter} - \text{chip diameter}}{\text{mold diameter}} \times 100$$

The glass filler content was determined by decomposing the polymer in a muffle furnace under nitrogen and weighing the remaining filler. For bronze fillers, the loss was found by finding the amount of filler in the water drained off.

EXAMPLE 1

This example illustrates the use of the amino-functional organosilane in the process of this invention and compares its presence with an instance in which it is not present.

In this example, agitation was carried out in a stainless steel vessel 15.24 cm. in diameter and 20.32 cm. deep, equipped with two baffles 1.27 cm. wide. The stirrer used was 7.62 cm. in diameter, having 4 blades, each 1.27 cm. wide with a 45° downdraft pitch. Sixteen hundred ml of demineralized water was charged to the vessel and heated to the temperature shown in the following Tables 1-A, B and C.

The organic liquid employed was tetrachloroethylene in an amount of 81 gm (50 ml). The amino-functional silane employed was γ-aminopropyl triethoxysilane. The tetrafluoroethylene polymer employed was polytetrafluoroethylene having a granule size of about 35μ. 200 G of PTFE/filler blend were used in each run. The filler employed was glass fiber having a maximum length of about 0.078 cm. and about an 11 micron diameter. For each run, agitation was started at 1000 rpm and continued for 5 minutes, then reduced to the speed and for the time shown in Tables 1-A, B and C under Second Stage Agitation. Temperature employed throughout is also shown. After agitation, the agglomerated product was recovered by draining the mixture onto a screen with 250 micron size openings. The dewatered product was then dried in a vacuum oven at 130°C. Characterization of the agglomerated product of each run is shown in Table 1-D.

TABLE 1-A

This Table illustrates that loss of filler decreases with increasing amino-functional organosilane content.

| Run | Filler (% by weight of blend) | cc of amino-silane | Temp. (°C.) | Second stage agitation time (min.) | rpm | % Filler in final product |
|---|---|---|---|---|---|---|
| Comparison | (21%) | 0 | 40 | 25 | 600 | 15.8 |
| 1 | " | 0.02 | " | " | " | 16.3 |
| 2 | " | 0.1 | " | " | " | 18.6 |
| 3 | " | 0.3 | " | " | " | 18.7 |
| 4 | " | 0.5 | " | " | " | 20.6 |

TABLE 1-B

This Table illustrates that results may be improved for a constant amount of silane by operating at lower temperatures (probably due to hydrolysis.

| Run | Filler (% by weight of blend) | cc of amino-silane | Temp. (°C.) | Second stage agitation time (min.) | rpm | % Filler in final product |
|---|---|---|---|---|---|---|
| Comparison A | (21%) | 0 | 40 | 25 | 600 | 15.8 |
| 1 | " | 0.5 | 40 | " | " | 20.6 |
| 2 | " | 0.5 | 50 | " | " | 19.4 |
| 3 | " | 0.5 | 60 | " | " | 19.1 |
| Comparison B | " | 0 | 70 | " | " | 15.7 |
| 4 | " | 0.5 | 70 | " | " | 18.4 |
| 5 | " | 1.0 | 70 | " | " | 18.9 |
| 6 | " | 2.0 | 70 | " | " | 20.1 |

TABLE 1-C

This Table illustrates that the effectiveness of the amino-functional organosilane decreases as the glass filler concentration increases.

| Run | Filler (% by weight of blend) | cc of amino-silane | Temp. (°C.) | Second stage agitation time (min.) | rpm | % Filler in final product |
|---|---|---|---|---|---|---|
| Comparison A | 21 | 0 | 50 | 25 | 600 | 16.5 |
| 1 | 21 | 0.5 | " | " | " | 19.4 |
| Comparison B | 32.5 | 0 | 50 | 55 | 600 | 26.5 |
| 2 | 32.5 | 0.5 | " | " | " | 28.5 |
| 3 | 32.5 | 5.0 | " | " | " | 28.9 |
| 4 | 40 | 0.5 | 40 | 25 | 600 | 32.6 |

TABLE 1-D

This Table shows the product characteristics of the agglomerated products obtained in Tables 1-A, B and C and illustrates their acceptability as molding resins.

| Product Table and Run | AD g./l. | SSG | MS | TS/Elongation | Average Particle Size (μ) |
|---|---|---|---|---|---|
| Table 1-A |  |  |  |  |  |
| Comparison | 806 | 2.203 | 1.77 | 3120/299 | 630 |
| 1 | 806 | 2.204 | 1.94 | 2960/275 | 600 |
| 2 | 781 | 2.205 | 1.94 | 2800/269 | 600 |
| 3 | 794 | 2.209 | 1.94 | 2970/268 | 530 |
| 4 | 781 | 2.210 | 1.59 | 2770/259 | 650 |
| Table 1-B |  |  |  |  |  |
| Comparison A | 806 | 2.203 | 1.77 | 3120/299 | 630 |
| 1 | 781 | 2.210 | 1.59 | 2760/276 | 650 |
| 2 | 806 | 2.210 | 1.68 | 2860/280 | 600 |
| 3 | 820 | 2.208 | 1.68 | 2950/290 | 580 |
| Comparison B | 833 | 2.203 | 1.77 | 3170/293 | 570 |
| 4 | 820 | 2.208 | 1.68 | 3000/288 | 590 |
| 5 | 806 | 2.208 | 1.94 | 2720/245 | 530 |
| 6 | 794 | 2.208 | 1.86 | 2500/218 | 510 |
| Table 1-C |  |  |  |  |  |
| Comparison A | 806 | 2.203 | 1.86 | 2130/294 | 650 |
| 1 | 794 | 2.210 | 1.68 | 2860/280 | 600 |
| Comparison B | 862 | 2.200 | 1.59 | 2430/257 | 790 |
| 2 | 909 | 2.230 | 1.59 | 2390/254 | 760 |
| 3 | 909 | 2.235 | 1.68 | 2360/263 | 740 |
| 4 | 862 | 2.206 | 1.06 | 1920/188 | 650 |

EXAMPLE 2

This example illustrates the use of silicone resins in the process of this invention. The comparisons show the improvements in filler retention obtained by the process.

The vessel and stirring apparatus used are described in Example 1. Sixteen hundred ml of water was charged to the vessel and heated to 50°C. The amount of silicone resin listed in the following Table was added, along with 40 ml of tetrachloroethylene (organic liquid), followed by 200 gm of the PTFE/filler blend. The tetrafluoroethylene polymer used was the one of Example 1 and it was employed in the same amount. Agitation was then started at 1000 rpm and continued for 5 minutes at which time the agitation was reduced to 800 rpm and continued for 55 minutes. The agglomerated product was recovered by draining onto a 60 mesh screen and dried as in Example 1.

Results are provided in Tables 2-A and 2-B.

TABLE 2-A

| Run | Filler % by weight of blend | Silicone resin used phenyl methyl siloxane- Dow Corning 805 (gm) | gm filler lost | % Filler in final product |
|---|---|---|---|---|
| Comparison | Makin spherical bronze (60%) molybdenum disulfide (4%)** | 0 | 25.2 | |
| 1 | " | 0.1 | 7.3 | |
| 2 | " | 0.25 | 0 | |
| 3 | " | 0.5 | 0 | |
| Comparison* | (21%) | 0 | | 16.5 |
| 4* | " | 1.0 | | 18.0 |

* Used 50 mol of tetrachloroethylene instead of 40 ml.
** Particle size less than 50 microns.

TABLE 2-B

This Table shows the product characteristics of the agglomerated products obtained in Table 2-A and illustrates their acceptability as molding resins.

| Run | AD g/l | SSG | MS | TS/Elongation | Average Particle Size (μ) |
|---|---|---|---|---|---|
| Comparison | 1516 | — | — | | 830 |
| 1 | 1613 | 3.858 | 1.24 | 1790/63 | 810 |
| 2 | 1667 | 3.864 | 1.06 | 1644/86 | 740 |
| 3 | 1667 | 3.847 | 1.15 | 1594/92 | 780 |
| Comparison | 806 | 2.203 | 1.86 | 2130/294 | 650 |
| 4 | 833 | 2.184 | 1.68 | 2770/259 | 680 |

EXAMPLE 3

In this example, the equipment, ingredients and procedure used were as in Example 1, except the fiberglass filler was replaced with the Makin spherical bronze filler described above. Results are described in Tables 3-A and B.

TABLE 3-A

| Run | % Filler by weight of blend | cc of aminosilane | Temp. (°C.) | Second stage agitation time (min.) | rpm | gm filler lost |
|---|---|---|---|---|---|---|
| Comparison A | 60% | 0 | 40 | 55 | 800 | 12.4 |
| 1 | " | 0.5 | 40 | " | " | 0 |
| Comparison B | " | 0 | 50 | " | " | 9.4 |
| 2 | " | 0.5 | 50 | " | " | 0 |
| Comparison C | " | 0 | 60 | " | " | 9.6 |
| 3 | " | 0.5 | 60 | " | " | 0 |

TABLE 3-B

This Table shows the product characteristics of the agglomerated products obtained in Table 3-A, and illustrates their acceptability as molding resins.

| Run | AD g/l | SSG | MS | TS/Elongation | Average Particle Size (μ) |
|---|---|---|---|---|---|
| Comparison A | 1610 | 3.788 | 2.03 | 2610/230 | 780 |
| 1 | 1610 | 3.884 | 1.94 | 2320/215 | 710 |
| Comparison B | 1560 | 3.799 | 2.12 | 2508/246 | 810 |
| 2 | 1610 | 3.889 | 1.94 | 2100/175 | 760 |
| Comparison C | 1610 | 3.803 | 2.12 | 2380/265 | 800 |
| 3 | 1670 | 3.891 | 1.86 | 2230/210 | 700 |

The embodiments of the invention in which an exclusive property or privilege is claimed are defined as follows:

1. In the process for preparing filled agglomerated granules of non-melt-fabricable granular tetrafluoroethylene polymer in which the filler is particulate glass, bronze, or a mixture thereof present in an amount of between about 5% and 40% by volume of the total volume, by agitating a finely-divided blend of said granular tetrafluoroethylene polymer and said filler in which the particle size of the finely-divided tetrafluoroethylene polymer averages numerically below about 200 microns and in which the filler is present in an amount between about 5% and 40% by volume, in a two-phase liquid medium consisting essentially of water and an organic liquid which is soluble in water up to at most 15% by weight at the operating temperature of the process and which has a surface tension no greater than about 40 dynes/cm. at 25°C., and in which the organic liquid is present in an amount of 0.1 to 0.5 cc per gram of said blend, said liquid medium containing said blend having between about 5 to 30% by weight solids content, the improvement wherein said liquid medium contains a silicon compound which is either an amino-functional organosilane present in an amount of between 0.01 and 5 parts per 1000 parts by weight of water or a silicone resin soluble in said organic liquid present in an amount of between 0.5 and 30 parts per 1000 parts by weight of said finely-divided blend.

2. The process of claim 1 wherein the silicon compound is the amino-functional organosilane.

3. The process of claim 2 wherein the filler is glass.

4. The process of claim 3 wherein the organo-silane is represented by the formula

wherein A is a water-hydrolyzable functional group, B is an aliphatic or aromatic hydrocarbyl group of 1–14 carbon atoms containing amino functionality, and each D is A, B, alkyl of 1–5 carbon atoms, aryl of 6–10 carbon atoms, alkaryl of 7–10 carbon atoms or aralkyl of 7–10 carbon atoms.

5. The process of claim 4 wherein the agitation is carried out at a temperature of between 0° and almost 100°C. provided the temperature is not high enough to cause boiling of the liquid medium.

6. The process of claim 5 wherein the organic liquid is tetrachloroethylene.

7. The process of claim 1 wherein the silicon compound is a silicone resin.

8. The process of claim 7 wherein the filler is bronze.

9. The process of claim 8 wherein the silicone resin has the formula

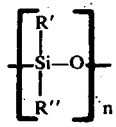

wherein each R' and R" independently is a hydrocarbyl group of 1–20 carbon atoms, or hydrogen, and $n$ is an integer of between about 100 and about 2000, and wherein the resin may be modified with up to about 4% hydroxy function.

10. The process of claim 9 wherein the agitation is carried out at a temperature of between 0° and almost 100°C. provided the temperature is not high enough to cause boiling of the liquid medium.

11. The process of claim 10 wherein the organic liquid is tetrachloroethylene.

* * * * *